(12) United States Patent
Mun

(10) Patent No.: US 8,418,417 B2
(45) Date of Patent: Apr. 16, 2013

(54) PHOTOVOLTAIC MODULE

(75) Inventor: Hyunrok Mun, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/155,914

(22) Filed: Jun. 8, 2011

(65) Prior Publication Data

US 2011/0232728 A1    Sep. 29, 2011

(30) Foreign Application Priority Data

Oct. 28, 2010    (KR) .................. 10-2010-0106180

(51) Int. Cl.
*E04D 13/18*    (2006.01)

(52) U.S. Cl.
USPC ........................................ 52/173.3; 136/251

(58) Field of Classification Search ................. 52/173.3, 52/797.1, 800.12, 800.14, 800.1; 136/251, 136/259
See application file for complete search history.

(56) References Cited

U.S. PATENT DOCUMENTS

| | | | |
|---|---|---|---|
| 5,121,583 A * | 6/1992 | Hirai et al. | 52/90.1 |
| 5,406,936 A * | 4/1995 | Hirai et al. | 126/623 |
| 5,497,587 A * | 3/1996 | Hirai et al. | 52/173.3 |
| 6,201,180 B1 * | 3/2001 | Meyer et al. | 136/244 |
| 6,437,235 B1 * | 8/2002 | Komori et al. | 136/251 |
| 7,956,279 B2 * | 6/2011 | Morita et al. | 136/251 |
| 2008/0172955 A1 * | 7/2008 | McClintock et al. | 52/173.3 |
| 2008/0196350 A1 * | 8/2008 | Ruhle et al. | 52/741.1 |
| 2008/0276983 A1 * | 11/2008 | Drake et al. | 136/251 |
| 2009/0314335 A1 * | 12/2009 | McClintock | 136/251 |
| 2011/0252724 A1 * | 10/2011 | Heisler | 52/173.3 |
| 2011/0302857 A1 * | 12/2011 | McClellan et al. | 52/173.3 |
| 2011/0314752 A1 * | 12/2011 | Meier | 52/173.3 |

FOREIGN PATENT DOCUMENTS

| | | |
|---|---|---|
| EP | 2 157 620 A1 | 2/2010 |
| JP | 9-148612 A | 6/1997 |
| JP | 10-294485 A | 11/1998 |
| JP | 2004-165556 A | 6/2004 |
| JP | 2010-206229 A | 9/2010 |
| KR | 10-2000-0010898 A | 2/2000 |

* cited by examiner

*Primary Examiner* — Jeanette E Chapman
*Assistant Examiner* — James Buckle, Jr.
(74) *Attorney, Agent, or Firm* — McKenna Long & Aldridge LLP (57) ABSTRACT

A photovoltaic module has a reinforcement beam for strength reinforcement. The photovoltaic module includes a solar panel having one or more solar cells, a frame surrounding an edge of the solar panel, and a reinforcement beam connecting two separate sides of the frame at the rear of the solar panel, which is opposite to a light receiving surface of the solar panel upon which solar light is incident, the reinforcement beam having a hollow space defined therein.

14 Claims, 10 Drawing Sheets

PHOTOVOLTAIC MODULE

This application claims the priority benefit of Korean Patent Application No. 10-2010-0106180, filed on Oct. 28, 2010 in the Korean Intellectual Property Office, the disclosure of which is incorporated herein by reference.

BACKGROUND

1. Field of the Disclosure

The present disclosure relates to a photovoltaic module, and more particularly to a photovoltaic module having a reinforcement beam for strength reinforcement.

2. Background

In recent years, exhaustion of existing energy resources, such as petroleum and coal, has been forecasted with the result that interest in alternative energy resources substituting for the existing energy resources has risen. Among such alternative energy resources is a solar cell that directly converts solar light energy into electrical energy using a semiconductor device, which is in the spotlight as a next-generation cell.

A solar cell is a device that converts light energy into electric energy using a photovoltaic effect. The solar cell may be classified as a crystalline silicon solar cell, a thin film solar cell, a dye-sensitized solar cell, or an organic solar cell.

SUMMARY

It is desirable that a photovoltaic module including solar cells, which are modularized to be installed outdoors, includes a structure for strength reinforcement. Therefore, one object is to provide a photovoltaic module having a reinforcement beam for strength reinforcement.

Another object is to provide a photovoltaic module having a reinforcement beam which is optimally designed in consideration of convenience, safety and assemblability.

Other objects that have not been mentioned above may become evident to those skilled in the art from the following description.

In accordance with one aspect, one or more objects above and/or other objects may be accomplished by the provision of a photovoltaic module including a solar panel having one or more solar cells, a frame surrounding an edge of the solar panel, and a reinforcement beam connecting two separate sides of the frame at the rear of the solar panel, which is opposite to a light receiving surface of the solar panel upon which solar light is incident, the reinforcement beam having a hollow space defined therein.

Details of other embodiments are included in the following description and the accompanying drawings.

BRIEF DESCRIPTION OF THE DRAWINGS

The above and other objects, features and advantages may be more clearly understood from the following detailed description taken in conjunction with the accompanying drawings, in which.

DETAILED DESCRIPTION OF THE PREFERRED EMBODIMENTS

Advantages and features and the way of achieving them may become apparent with reference to embodiments described below in conjunction with the accompanying drawings. However, the present invention is not limited to embodiments disclosed in the following description but may be embodied in various different forms. Throughout the specification, the same components are denoted by the same reference numerals.

Hereinafter, embodiments of the present invention will be described in detail with reference to the accompanying drawings illustrating photovoltaic modules.

Figure 1:
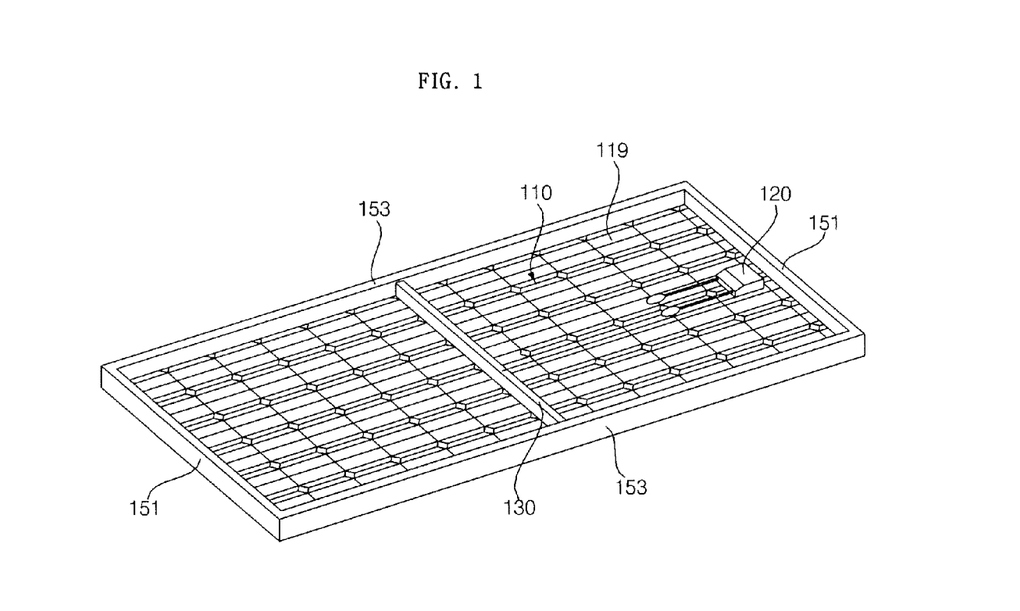
FIG. 1 is a perspective view illustrating a photovoltaic module according to an embodiment of the present invention.

FIG. 1 is a perspective view illustrating a photovoltaic module according to an embodiment of the present invention.

In this embodiment of the present invention, the photovoltaic module includes a solar panel 110 having a plurality of solar cells 119, a frame 150 surrounding the edge of the solar panel 110, the frame 150 which may be formed or substantially formed in a quadrangular shape, and a reinforcement beam 130 connecting opposite sides of the frame 150 at the rear of the solar panel 110, the reinforcement beam 130 being formed in an II shape, the reinforcement beam 130 having a hollow space defined therein.

The solar cells 119 of the solar panel 110 generate photovoltaic power from solar light incident thereupon. The solar panel 110 may be formed or substantially formed in a quadrangular shape. In other embodiments, the solar panel 110 may be formed or substantially formed in a polygonal shape. The structure of the solar panel 110 will be described below in detail with reference to FIG. 4.

The solar panel 110 includes a light receiving surface upon which solar light is incident and a back surface which is opposite to the light receiving surface. The solar panel 110 is installed inclined toward the sun so that the light receiving surface of the solar panel 110 is perpendicular or substantially perpendicular to solar light. In other embodiments, the inclination of the solar panel 110 may be adjusted so that the light receiving surface of the solar panel 110 is directed toward the sun according to the position of the sun.

The solar panel 110 may be provided at the rear surface thereof with a junction box 120 for collecting photovoltaic power produced by the solar cells 119. The junction box 120 includes a condenser for charging and discharging electrical energy and a diode for preventing electric current from flowing backward.

The frame 150 may be formed or substantially formed in a quadrangular shape to surround the edge of the solar panel 110. Based on the shape of the solar panel 110, the frame 150 may be formed or substantially formed in a quadrangular shape or in a polygonal shape. In a case in which the frame 150 is formed or substantially formed in a rectangular shape, the frame 150 includes two long sides 153 and two short sides 151.

The frame 150 surrounds the edge of the solar panel 110. Based on the shape of the solar panel 110, the frame 150 may be formed or substantially formed in a quadrangular shape or in a polygonal shape. In a case in which the solar panel 110 is formed or substantially formed in a quadrangular shape, the frame 150 is formed or substantially formed in a quadrangular shape corresponding to the solar panel 110.

In a case in which the frame 150 is formed or substantially formed in a rectangular shape, the frame 150 includes two long sides 153 and two short sides 151.

Preferably, the frame 150 covers the edge of the light receiving surface and/or the rear surface of the solar panel 110, a detailed description of which will be described below with reference to FIG. 4.

The reinforcement beam 130 is disposed at the rear surface of the solar panel 110. Preferably, the reinforcement beam 130 is disposed at the rear surface of the solar panel 110 so that the reinforcement beam 130 is spaced a predetermined distance from the solar panel 110.

The reinforcement beam 130 connects two separate sides of the frame 150 at the rear surface of the solar panel 110. In a case in which the frame 150 is formed or substantially in a quadrangular shape, the reinforcement beam 130 connects opposite sides of the frame 150. In a case in which the frame 150 is formed or substantially formed in a rectangular shape, the reinforcement beam 130 preferably connects the two long sides 153 of the frame 150. In a case in which a single reinforcement beam 130 is provided, the reinforcement beam 130 preferably connects the two long sides 153 of the frame 150 at the middle of each of the long sides 153 of the frame 150. That is, the reinforcement beam 130 may be disposed halfway between the two short sides 151 of the frame 150.

Sides of the reinforcement beam 130 partially protrude in the direction parallel to the solar panel 110. Alternatively, the sides of the reinforcement beam 130 may be partially depressed in the direction parallel to the solar panel 110. In this embodiment, the reinforcement beam 130 is formed in an II shape having a hollow space defined therein, a detailed description of which will be described below.

Figure 2:
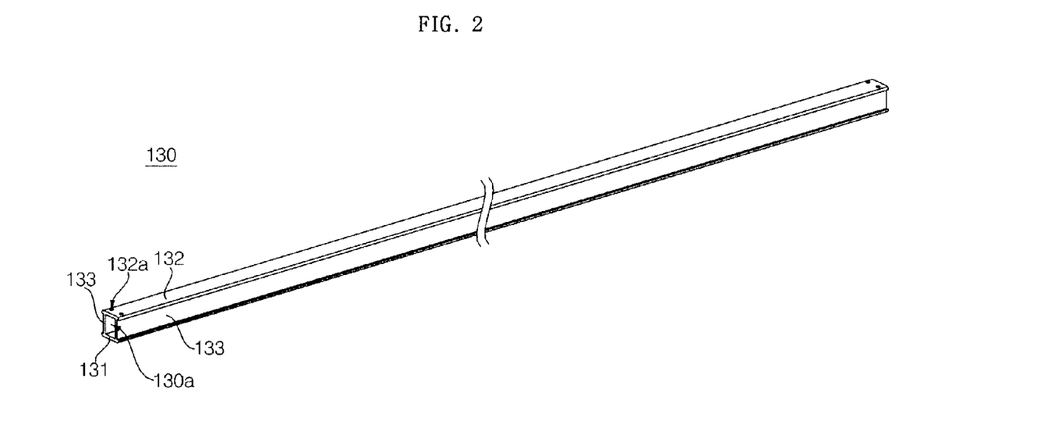
FIG. 2 is a perspective view illustrating a reinforcement beam of the photovoltaic module according to the embodiment of the present invention shown in FIG. 1.
Figure 3:
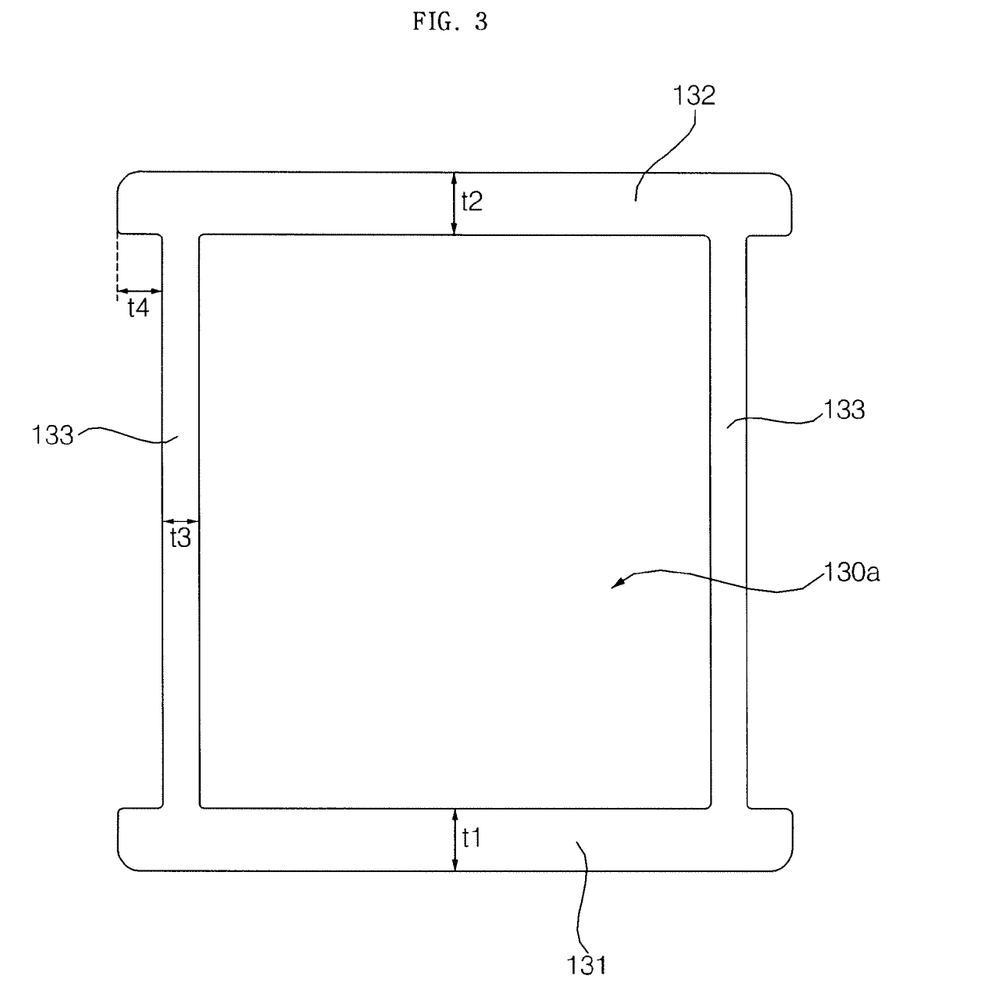
FIG. 3 is a sectional view of the reinforcement beam shown in FIG. 2.

FIG. 2 is a perspective view illustrating the reinforcement beam of the photovoltaic module according to the embodiment of the present invention shown in FIG. 1, and FIG. 3 is a sectional view of the reinforcement beam shown in FIG. 2.

In this embodiment of the present invention, the reinforcement beam 130 includes a first flange 131 disposed at the solar panel 110 side so that the first flange 131 is parallel to the solar panel 110, a second flange 132 disposed spaced apart from the first flange 131 so that the second flange 132 is parallel to the first flange 131, and a plurality of webs 133 disposed perpendicular to the first flange 131 and the second flange 132 while being spaced apart from each other for connecting the first flange 131 and the second flange 132.

The first flange 131 and the second flange 132 are disposed at the rear surface of the solar panel 110 so that the first flange 131 and the second flange 132 are parallel to the solar panel 110. The first flange 131 is disposed closer to the rear surface of the solar panel 110 than the second flange 132 is. Preferably, the first flange 131 is spaced approximately 6 mm from the rear surface of the solar panel 110. The second flange 132 may be provided at opposite ends thereof with second flange holes 132a through which coupling members, which will be described below, are inserted.

Preferably, a plurality of second flange holes 132a is formed at each end of the second flange 132. Preferably, as shown in FIG. 2, two second flange holes 132a are formed at each end of the second flange 132 in a parallel fashion so that two coupling members 154 are inserted through the two second flange holes 132a.

The webs 133 connect the first flange 131 and the second flange 132. The webs 133 are disposed so that the webs 133 are depressed from the sides of the first flange 131 and the second flange 132. That is, the webs 133 are disposed so that the sides of the first flange 131 and the second flange 132 protrude to the outside.

Preferably, the webs 133 are disposed so that the sides of the first flange 131 and the second flange 132 protrude, whereby it is possible for a worker or a user to conveniently grip the reinforcement beam 130.

The webs 133 are disposed spaced apart from each other to shear stress generated upon drooping of the reinforcement beam 130, thereby efficiently diminishing the shear stress. Since the webs 133 are disposed spaced apart from each other, a hollow space 130a is defined in the reinforcement beam 130. The provision of the hollow space 130a reduces the weight of the reinforcement beam 130. Also, coupling members 154, which will be described below, may protrude into the hollow space 130a, thereby securing safety of a worker or a user. In addition, coupling protrusions 153-6 and 153-7, which will be described below (see FIG. 9), of the frame 150 may protrude into the hollow space 130a to achieve coupling between the frame 150 and the reinforcement beam 130.

The thickness t2 of the second flange 132 is preferably greater than the thickness t1 of the first flange 131. Preferably, $t2=1.1*t1$.

The thickness t3 of each of the webs 133 is preferably less than the thickness t1 of the first flange 131. Preferably, $t3=0.6*t1$.

The depression distance t4 of each of the webs 133, i.e. the distance by which each of the webs 133 is depressed from the sides of the first flange 131 and the second flange 132, is preferably less than the thickness t1 of the first flange 131. Preferably, $t4=0.6*t1$.

Figure 4:
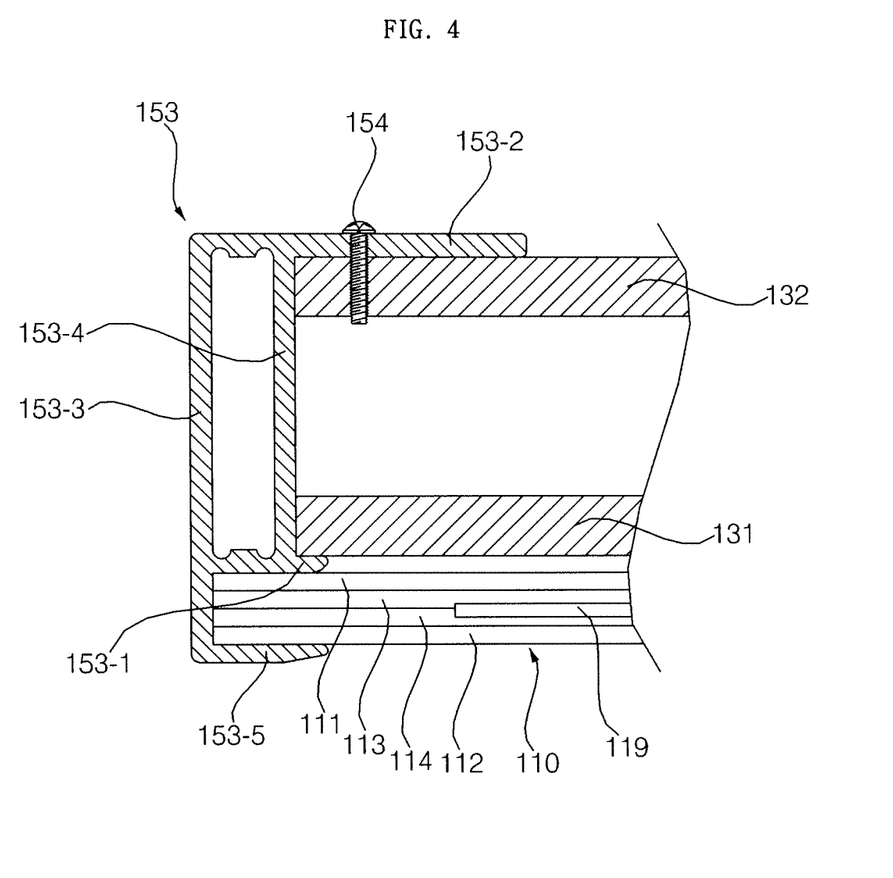
FIG. 4 is a partial sectional view of the photovoltaic module according to the embodiment of the present invention shown in FIG. 1.

FIG. 4 is a partial sectional view of the photovoltaic module according to the embodiment of the present invention shown in FIG. 1.

In this embodiment of the present invention, each of the long sides 153 of the frame 150 includes a first long side horizontal part 153-1 contacting the first flange 131 of the reinforcement beam 130 and the rear surface of the solar panel 110 for supporting the first flange 131 of the reinforcement beam 130 and the rear surface of the solar panel 110, a second long side horizontal part 153-2 contacting the second flange 132 of the reinforcement beam 130 for supporting the second flange 132 of the reinforcement beam 130, a third long side horizontal part 153-5 contacting the light receiving surface of the solar panel 110 for supporting the light receiving surface of the solar panel 110, a first long side vertical part 153-3 forming the outside of the frame 150 and contacting the side of the solar panel 110, and a second long side vertical part 153-4 contacting the side of the reinforcement beam 130.

As shown in FIG. 4, the reinforcement beam 130 is coupled to the frame 150 in which the reinforcement beam 130 is fitted between the first long side horizontal part 153-1 and the second long side horizontal part 153-2. The solar panel 110 is coupled to the frame 150 in which the solar panel 110 is fitted between the first long side horizontal part 153-1 and the third long side horizontal part 153-5.

A coupling member 154 is inserted through the second long side horizontal part 153-2 of the frame 150 and the second flange 132 of the reinforcement beam 130 to achieve coupling between the frame 150 and the reinforcement beam 130. The coupling member 154 protrudes into the hollow space 130a of the reinforcement beam 130 through a hole (not shown) formed at the second long side horizontal part 153-2 of the frame 150 and a corresponding second flange hole 132a of the second flange 132.

Preferably, a plurality of coupling members 154 is provided so that the coupling members 154 are inserted through a plurality of second flange holes 132a of the second flange 132 and a plurality of holes formed at the second long side horizontal part 153-2 of the frame 150. That is, a plurality of coupling members 154 is preferably provided to achieve coupling between the frame 150 and the reinforcement beam 130. Preferably, the coupling members 154 are vertically disposed in a parallel fashion, as shown in FIG. 4.

The coupling members 154 may be embodied by bolts, male screws, pins, or any element that achieves coupling between components. In this embodiment, the coupling members 154 are embodied by bolts. In this case, nuts corresponding to the bolts may be provided. In a case in which the coupling members 154 are male screws, female screws are preferably formed at the second flange holes 132a of the second flange 132 and the holes formed at the second long side horizontal part 153-2 of the frame 150.

Also, in this embodiment of the present invention, the solar panel 110 includes a rectangular front substrate 112 upon which solar light is incident, solar cells 119 stacked on the front substrate 112 for generating photovoltaic power from the solar light incident upon the front substrate 111, and a rectangular rear substrate 111 stacked on the solar cells 119, the rear substrate 111 corresponding to the front substrate 112.

Each of the solar cells 119 is a semiconductor device which converts solar energy into electrical energy. For example, each of the solar cells 119 may be a crystalline silicon solar cell. The solar cells 119 are disposed between the front substrate 112 and the rear substrate 111.

The front substrate 112 is a layer for achieving efficient incidence of solar light and for protecting the solar cells 119. Preferably, the front substrate 112 is made of low-iron tempered glass which exhibits a high incidence rate of solar light and is capable of protecting the solar cells 119. The front substrate 112 may be processed so that the front substrate 112 exhibits a high optical transmittance and a low optical reflection loss at the surface thereof. One major surface of the front substrate 112 corresponds to the light receiving surface of the solar panel 110.

The rear substrate 111 is a layer disposed opposite to the front substrate 112 for protecting the solar cells 119 at the side opposite to the front substrate 112. It is necessary for the rear substrate 111 to exhibit high vapor interception and insulation. Preferably, the rear substrate 111 is made of a highly reflective material by which solar light incident upon the front substrate 112 is reflected and used. The rear substrate 111 may be made of a transparent material upon which solar light is incident. One major surface of the rear substrate 111 corresponds to the rear surface of the solar panel 110.

Encapsulants 113 and 114 are layers for sealing the solar cells 119 disposed between the front substrate 112 and the rear substrate 111. The encapsulants 113 and 114 intercept moisture or oxygen for preventing the solar cells 119 from being adversely affected. Preferably, the encapsulants 113 and 114 are made of a material exhibiting high deterioration resistance to hydrolysis or ultraviolet rays and a high incidence rate of solar light. Also preferably, the encapsulants 113 and 114 exhibit high hydrolysis resistance, high transparency, high weather resistance, high temperature resistance, light weight, and minimum change of dimensions due to heat.

The encapsulants 113 and 114 may be made of ethylene vinyl acetate (EVA) copolymer resin, polyvinyl butyral, partially oxidized EVA, silicon resin, ester resin, or olefin resin. In this embodiment, the encapsulants 113 and 114 are made of an EVA film.

The encapsulants 113 and 114 are provided to seal opposite main surfaces of the solar cells 119. The first encapsulant 113 is disposed between the solar cells 119 and the front substrate 112, and the second encapsulant 114 is disposed between the solar cells 119 and the rear substrate 111.

In the above description, each of the solar cells 119 of the solar panel 110 is a crystalline silicon solar cell. In other embodiments, however, each of the solar cells 119 may be an amorphous silicon (a-Si) solar cell, a microcrystalline silicon (c-Si) solar cell, a compound semiconductor solar cell, a tandem solar cell, a copper indium gallium selenium (CIGS) solar cell, a cadmium telluride (CdTe) solar cell, a dye-sensitized solar cell, or an organic solar cell.

Figure 5:
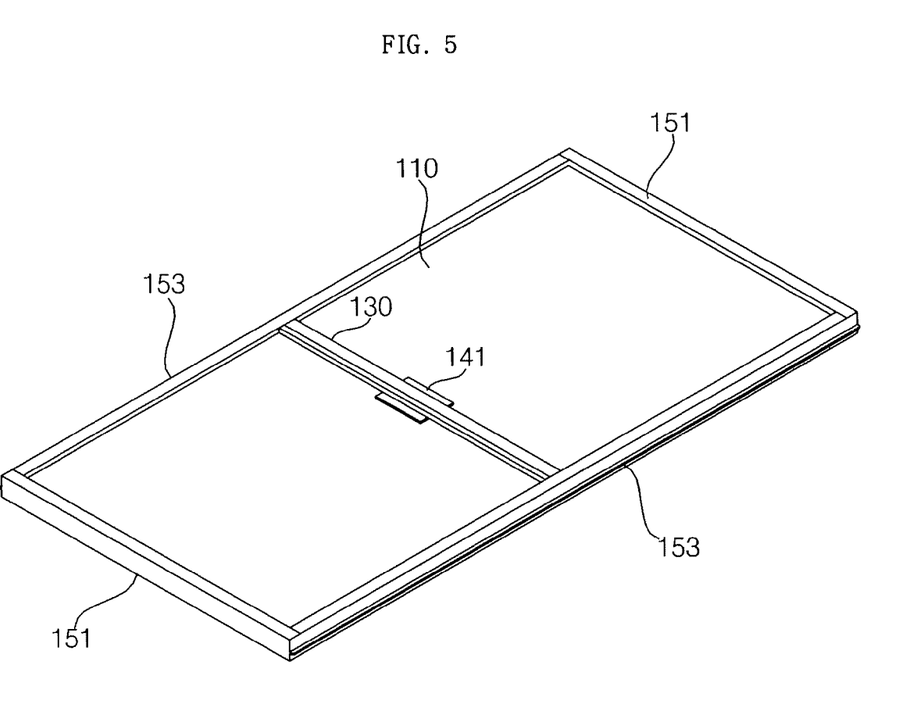
FIG. 5 is a perspective view illustrating a photovoltaic module according to another embodiment of the present invention.

FIG. 5 is a perspective view illustrating a photovoltaic module according to another embodiment of the present invention.

The photovoltaic module according to this embodiment of the present invention further includes a shock absorbing member 141 disposed between the rear surface of the solar panel 110 and the reinforcement beam 130.

Specifically, the shock absorbing member 141 is disposed between the rear substrate 111 of the solar panel 110 and the first flange 131 of the reinforcement beam 130. The shock absorbing member 141 prevents contact between the reinforcement beam 130 and the solar panel 110 due to drooping of the solar panel 110, thereby preventing damage to the solar panel 110.

Preferably, the shock absorbing member 141 is made of aluminum or hard plastic. In a case in which the shock absorbing member 141 is made of hard plastic, the shock absorbing member 141 may be made of polyurethane, polyethylene or polypropylene.

Preferably, the shock absorbing member 141 is disposed at the middle of the reinforcement beam 130 at which the drooping of the reinforcement beam 130 is the greatest.

Figure 6:
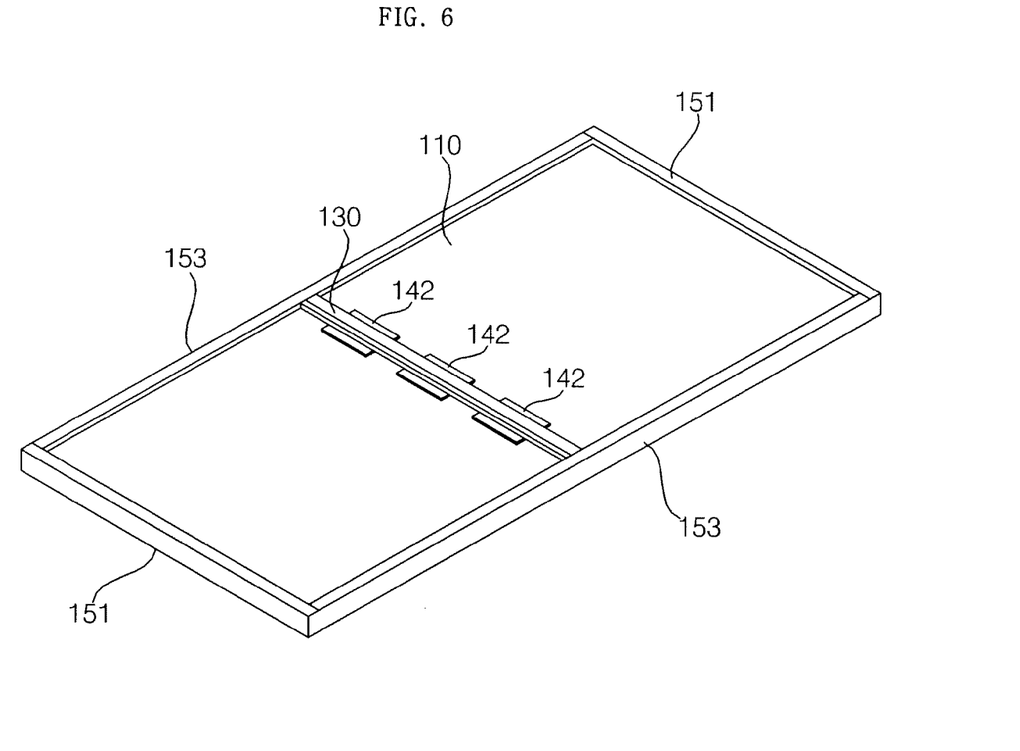
FIG. 6 is a perspective view illustrating a photovoltaic module according to another embodiment of the present invention.

FIG. 6 is a perspective view illustrating a photovoltaic module according to another embodiment of the present invention.

In the photovoltaic module according to this embodiment of the present invention, a plurality of shock absorbing members 142 is disposed at the reinforcement beam 130 so that the shock absorbing members 142 are arranged in intervals from the middle of the reinforcement beam 130. In a case in which the reinforcement beam 130 is long, the drooping of the reinforcement beam 130 may occur even at points of the reinforcement beam 130 between the middle shock absorbing member 142 and the frame 150. Preferably, therefore, the other shock absorbing members 142 are disposed at the points of the reinforcement beam 130 between the middle shock absorbing member 142 and the frame 150.

Figure 7:
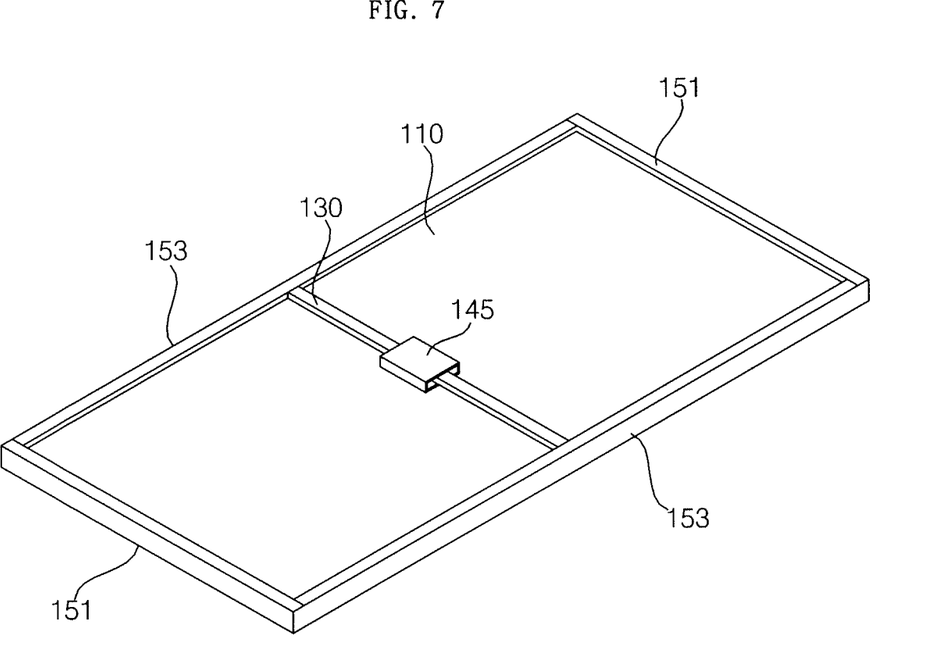
FIG. 7 is a perspective view illustrating a photovoltaic module according to another embodiment of the present invention.

FIG. 7 is a perspective view illustrating a photovoltaic module according to another embodiment of the present invention.

In the photovoltaic module according to this embodiment of the present invention, a shock absorbing member 145 is formed in a shape surrounding the reinforcement beam 130. The shock absorbing member 145 surrounds the reinforcement beam 130 with the result that the position of the shock absorbing member 145 does not change during assembly. Also, the shock absorbing member 145 surrounding the reinforcement beam 130 provides a worker or a user with a part which can be gripped by the worker or a user with a feeling of cushion.

Figure 8:
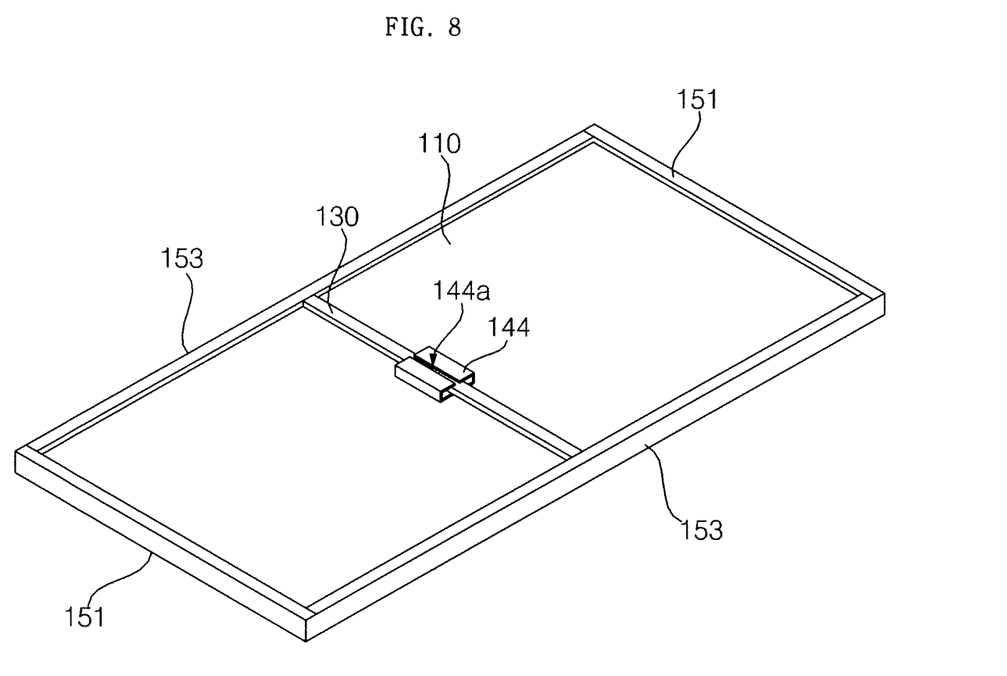
FIG. 8 is a perspective view illustrating a photovoltaic module according to another embodiment of the present invention.

FIG. 8 is a perspective view illustrating a photovoltaic module according to another embodiment of the present invention.

In the photovoltaic module according to this embodiment of the present invention, a shock absorbing member 144 surrounds the reinforcement beam 130 in which the shock absorbing member 144 has an opening 144a. That is, the shock absorbing member 144 surrounds the reinforcement beam 130 so that a portion of the shock absorbing member 144 is open, thereby achieving convenience of assembly. Preferably, the opening 144a of the shock absorbing member 144 is located on the second flange.

Figure 9:
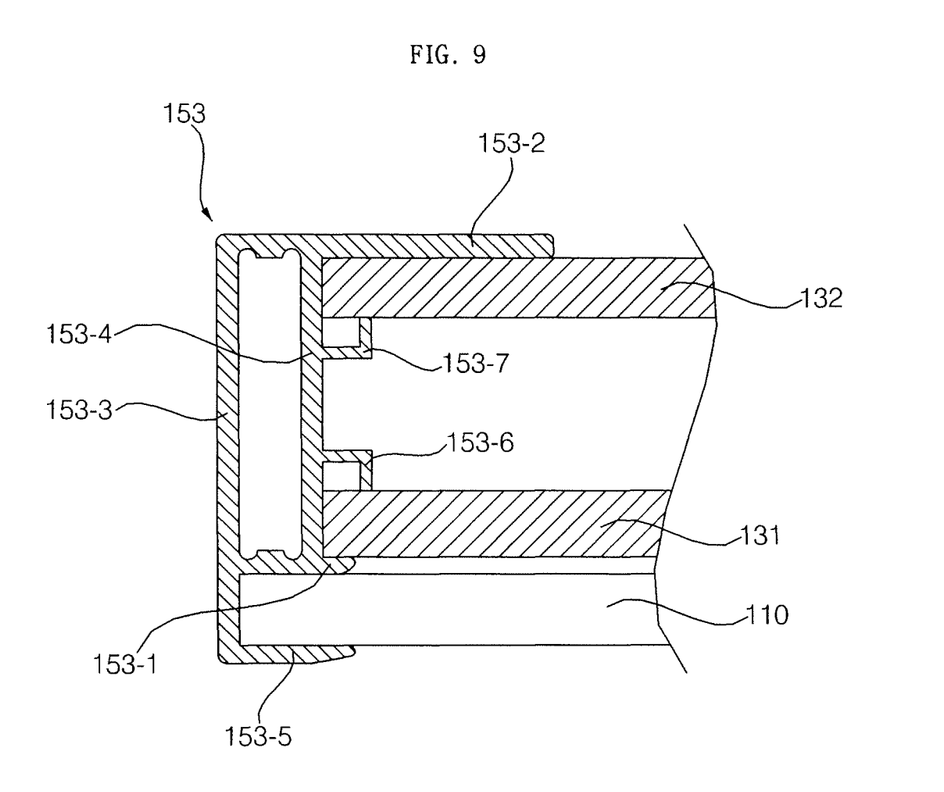
FIG. 9 is a partial sectional view illustrating a photovoltaic module according to another embodiment of the present invention.

FIG. 9 is a partial sectional view illustrating a photovoltaic module according to a further embodiment of the present invention.

In the photovoltaic module according to this embodiment of the present invention, coupling protrusions 153-6 and 153-7, which protrude into the hollow space 130a of the reinforcement beam 130, are formed at the second long side vertical part 153-4 of the frame. A plurality of coupling protrusions 153-6 and a plurality of coupling protrusions 153-7 may be provided. The first coupling protrusion 153-6 contacts the first flange 131 in the hollow space 130a of the reinforcement beam 130, and the second coupling protrusion 153-7 contacts the second flange 132 in the hollow space 130a of the reinforcement beam 130.

As shown in FIG. 9, the first flange 131 is fitted between the first long side horizontal part 153-1 and the first coupling protrusion 153-6, and the second flange 132 is fitted between the second long side horizontal part 153-2 and the second coupling protrusion 153-7. As a result, coupling between the between the frame and the reinforcement beam 130 is achieved without the use of additional coupling members.

Figure 10:
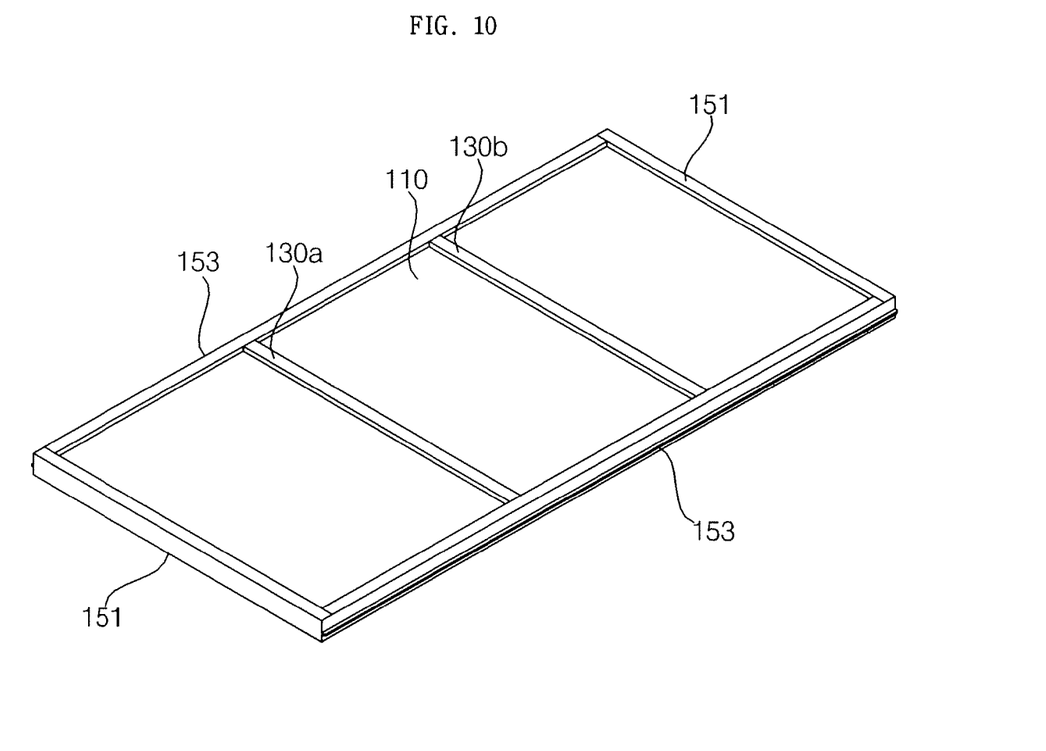
FIG. 10 is a perspective view illustrating a photovoltaic module according to another embodiment of the present invention.

FIG. 10 is a perspective view illustrating a photovoltaic module according to another embodiment of the present invention.

The photovoltaic module according to this embodiment of the present invention includes a plurality of reinforcement beams 130a and 130b. The reinforcement beams 130a and 130b are disposed between the two short sides 151 at regular intervals to connect the two long sides 153. Preferably, the reinforcement beams 130a and 130b are disposed between the two short sides 151 at equal intervals. That is, in a case in which two reinforcement beams 130a and 130b are provided as shown in FIG. 10, the reinforcement beams 130a and 130b may be disposed at points at which the frame is divided into three equal parts between the short sides 151.

A shock absorbing member 141 may be provided between each of the reinforcement beams 130a and 130b and the rear surface of the solar panel 110.

Figure 11:
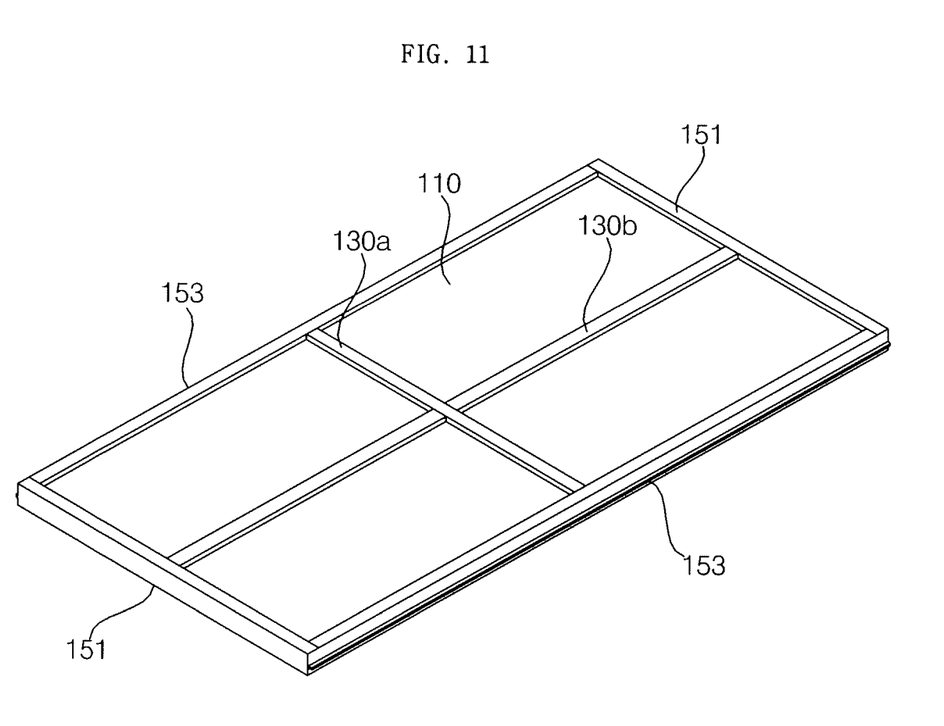
FIG. 11 is a perspective view illustrating a photovoltaic module according to another embodiment of the present invention.

FIG. 11 is a perspective view illustrating a photovoltaic module according to another embodiment of the present invention.

In the photovoltaic module according to this embodiment of the present invention, the reinforcement beam 130b connects the two short sides 151. Preferably, the reinforcement beam 130b connects the middle parts of the two short sides 151. In a case in which a plurality of reinforcement beams 130b is provided in other embodiments, the reinforcement beams 130b may be disposed between the two long sides 153 at regular intervals to connect the two short sides 151.

In addition to the reinforcement beam 130b connecting the two short sides 151, a reinforcement beam 130a may be further provided to connect the two long sides 153. In this case, the reinforcement beam 130a may connect the middle parts of the two long sides 153. Alternatively, a plurality of reinforcement beams 130a may be disposed between the two short sides 151 at regular intervals to connect the two long sides 153.

A shock absorbing member 141 may be provided between each of the reinforcement beams 130a and 130b and the rear surface of the solar panel 110.

Although the preferred embodiments of the present invention have been disclosed for illustrative purposes, those skilled in the art will appreciate that various modifications, additions and substitutions are possible without departing from the scope and spirit of the invention.

As is apparent from the above description, the photovoltaic module according to the embodiments of the present invention may have one or more of the following effects.

First, the photovoltaic module may have the effect of minimizing drooping of a reinforcement beam using a plurality of webs, thereby increasing strength of the photovoltaic module.

Second, the photovoltaic module may have the effect of achieving safe and convenient coupling between a frame and a reinforcement beam.

Third, the photovoltaic module may have the effect of enabling a worker or a user to conveniently grip a reinforcement beam during assembly or operation of the photovoltaic module.

Other effects that have not been mentioned above may become evident to those skilled in the art from the accompanying claims.

What is claimed is:

1. A photovoltaic module comprising:
a photovoltaic panel having one or more photovoltaic cells;
a frame surrounding an edge of the photovoltaic panel;
a reinforcement beam connecting two separate sides of the frame at a rear of the photovoltaic panel, which is opposite to a light receiving surface of the photovoltaic panel upon which solar light is incident, the reinforcement beam having a hollow space defined therein; and
a shock absorbing member provided between the rear of photovoltaic panel and the reinforcement beam;
wherein the reinforcement beam comprises:
a first flange disposed at the photovoltaic panel side so that the first flange is parallel to the photovoltaic panel;
a second flange disposed spaced apart from the first flange so that the second flange is parallel to the first flange; and
a plurality of webs disposed perpendicular to the first flange and the second flange while being spaced apart from each other for connecting the first flange and the second flange,
and wherein the hollow space is defined by the webs,
and wherein the first flange and the second flange are flat.

2. The photovoltaic module according to claim 1, wherein the reinforcement beam is formed in an II shape.

3. The photovoltaic module according to claim 1, wherein the webs are depressed from sides of the first flange and the second flange so that the sides of the first flange and the second flange protrude.

4. The photovoltaic module according to claim 3, wherein the webs are depressed from the sides of the first flange and the second flange by a distance less than a thickness of the first flange.

5. The photovoltaic module according to claim 1, wherein the second flange has a greater thickness than the first flange.

6. The photovoltaic module according to claim 1, wherein each of the webs has a less thickness than the first flange.

7. The photovoltaic module according to claim 1, further comprising:
- a coupling member inserted through the frame and the reinforcement beam from the rear of the photovoltaic panel for coupling the frame and the reinforcement beam, wherein
- the coupling member protrudes into the hollow space of the reinforcement beam.

8. The photovoltaic module according to claim 1, wherein the frame has a coupling protrusion protruding into the hollow space of the reinforcement beam, and the coupling protrusion contacts the reinforcement beam in the hollow space of the reinforcement beam for coupling the frame and the reinforcement beam.

9. The photovoltaic module according to claim 1, wherein the shock absorbing member is disposed at a middle part of the reinforcement beam.

10. The photovoltaic module according to claim 1, wherein the shock absorbing member comprises a plurality of the shock absorbing members disposed at the reinforcement beam so that the shock absorbing members are arranged in intervals from a middle of the reinforcement beam.

11. The photovoltaic module according to claim 1, wherein the shock absorbing member surrounds the reinforcement beam.

12. The photovoltaic module according to claim 11, wherein the shock absorbing member surrounds the reinforcement beam so that a portion of the shock absorbing member is open.

13. The photovoltaic module according to claim 1, wherein
- the frame is formed or substantially formed in a quadrangular shape, and
- the reinforcement beam connects two opposite sides of the frame.

14. The photovoltaic module according to claim 13, wherein the reinforcement beam comprises a plurality of reinforcement beams disposed at regular intervals for connecting the two opposite sides of the frame.

* * * * *